Aug. 4, 1931.  V. KOLAR  1,817,827
LIGHTING PLANT FOR AIR PORT LANDING PLACES
Filed Aug. 27, 1930
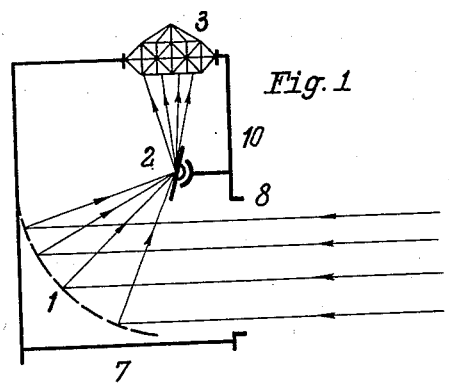
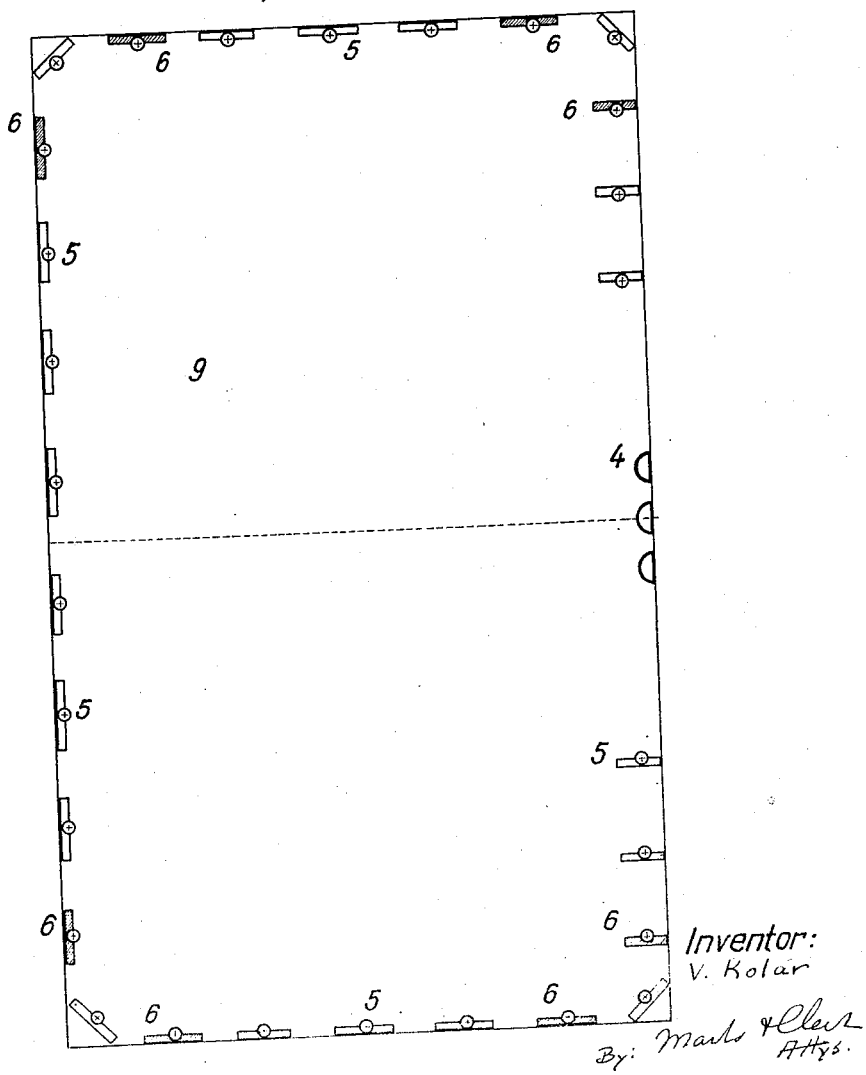
Inventor:
V. Kolar Patented Aug. 4, 1931

1,817,827

UNITED STATES PATENT OFFICE

VÁCLAV KOLÁŘ, OF MODRANY, NEAR PRAGUE, CZECHOSLOVAKIA, ASSIGNOR TO THE FIRM CESKOMORAVSKA-KOLBEN-DANEK COMPANY LIMITED, OF PRAGUE, CZECHOSLOVAKIA

LIGHTING PLANT FOR AIR-PORT LANDING PLACES

Application filed August 27, 1930, Serial No. 478,179, and in Czechoslovakia January 9, 1930.

For the illumination and delimitation of landing places for air ports, electric, acetylene or dissolved-gas lamps are employed, which require underground cables or pipes, thereby giving rise to great expense. On the same ground any shifting of the lamps, which is frequently necessary, is connected with heavy expenditure.

The present invention relates to a lighting plant for the landing places of air ports, in which all the lighting and delimiting units are illuminated from a common source of light, which may be provided outside the landing place, so that separate cables or pipes for individual light units are not necessary, and the shifting of the latter is considerably simplified.

According to the invention illumination units, known in themselves and consisting of polished or cast glass or other transparent substances, are employed, preferably in the form of prisms, each of which is associated with a system of mirrors by which as broad a beam of light as possible coming from the common source is reflected on to the prism and radiated by the latter.

A plant according to the invention is diagrammatically illustrated in the accompanying drawings, in which Figure 1 shows one illuminating unit in section, and Figure 2 shows the plant as a whole in plan.

Each illuminating unit comprises a preferably concave mirror 1 of glass or metal, a second mirror 2 passing through the focus of the mirror 1, and a transparent radiating unit 3. The two mirrors 1 and 2 are lodged in an opaque casing 7 formed with an aperture 8. The radiation unit 3 is inserted in the wall of the casing 7 in such a way that it can be illuminated from the inside and is visible externally.

The mirror 2 is rotatable about a preferably horizontal axis 9 passing through the focus of the mirror 1. If this device is employed as a boundary light, the mirror 2 is adjusted once for all and fixed in its adjusted position, so that the rays of light passing through the aperture 8 from a source of light such as a searchlight 4 are reflected convergently by the mirror 1 on to the mirror 2 and divergently by the latter on to the prism 3.

When this device is employed as a landing light one radiation unit or the other may be screened by merely rotating the mirror 2 by hand or mechanically, or even automatically by means of the wind, so that only the landing lights required in any particular instance are visible.

The landing place 9 is surrounded with a number of marginal radiation units 5 and landing light units 6 of the kind described, which are all illuminated in the manner described above by one or more searchlights 4, which may be provided even outside the landing place, the searchlights 4 illuminating the entire landing place at the same time. Since the individual illumination units 5 and 6 require no conductors, pipes, or switching devices, they may simply be placed on the ground and can therefore be easily shifted.

The mirrors 1 and 2 may of course be locally separated from the prisms 3, or replaced by other suitable reflecting devices.

What I claim is:—

1. Illuminating plant for the landing places of air ports, comprising a plurality of radiation units marking the boundary of the landing place, and a source of light adapted to direct beams of light towards the said radiation units, each radiation unit comprising a refracting prism, a mirror system adapter to receive a broad beam of light from the source of light and make it converge to a focus, and a second mirror located in the neighbourhood of the said focus and adapted to deflect the light diverging therefrom towards the refracting prism.

2. Illuminating plant for the landing places of air ports, comprising a plurality of radiation units marking the boundary of the landing place, and a source of light adapted to direct beams of light towards the said radiation units, each radiation unit comprising a refracting prism, a concave mirror adapted to receive a broad beam of light from the source of light and make it converge to a focus, and a second mirror located in the neighbourhood of the said focus and adapted to deflect the light diverging therefrom towards the refracting prism.

3. Illuminating plant for the landing places of air ports, comprising a plurality of radiation units marking the boundary of the landing place, and a source of light adapted to direct beams of light towards the said radiation units, each radiation unit comprising a refracting prism, a concave mirror adapted to receive a broad beam of light from the source of light and make it converge to a focus, and a second mirror rotatable about an axis passing through the said focus and adapted to deflect the light diverging therefrom towards the refracting prism.

4. Illuminating plant for the landing places of air ports, comprising a plurality of radiation units marking the boundary of the landing place, and a source of light adapted to direct beams of light towards the said radiation units, each radiation unit comprising a refracting prism, a concave mirror adapted to receive a broad beam of light from the source of light and make it converge to a focus, and a second mirror rotatable about a horizontal axis passing through the said focus and adapted to deflect the light diverging therefrom towards the refracting prism.

5. Illuminating plant for the landing places of air ports, comprising a plurality of radiation units marking the boundary of the landing place, and a source of light adapted to direct beams of light towards the said radiation units, each radiation unit comprising a casing, a refracting prism fitted into the top of the casing, and a mirror mounted inside the casing and adapted to receive a broad beam of light from the source of light and reflect it towards the refracting prism.

6. Illuminating plant for the landing places of air ports, comprising a plurality of radiation units marking the boundary of the landing place, and a source of light adapted to direct beams of light towards the said radiation units, each radiation unit comprising a casing, a refracting prism fitted into the top of the casing, a concave mirror mounted inside the casing and adapted to receive a broad beam of light from the source of light and make it converge to a focus, and a second mirror mounted inside the casing in the neighbourhood of the said focus and adapted to deflect the light diverging therefrom towards the refracting prism.

7. Illuminating plant for the landing places of air ports, comprising a plurality of radiation units marking the boundary of the landing place, and a source of light adapted to direct beams of light towards the said radiation units, each radiation unit comprising a casing, a refracting prism fitted into the top of the casing, a concave mirror mounted inside the casing and adapted to receive a broad beam of light from the source of light and make it converge to a focus, and a second mirror so mounted inside the casing as to be rotatable about an axis passing through the said focus and adapted to deflect the light diverging therefrom towards the refracting prism.

8. Illuminating plant for the landing places of air ports, comprising a plurality of radiation units marking the boundary of the landing place, and a source of light adapted to direct beams of light towards the said radiation units, each radiation unit comprising a casing, a refracting prism fitted into the top of the casing, a concave mirror mounted inside the casing and adapted to receive a broad beam of light from the source of light and make it converge to a focus, and a second mirror so mounted inside the casing as to be rotatable about a horizontal axis passing through the said focus and adapted to deflect the light diverging therefrom towards the refracting prism.

In testimony whereof I have signed my name to this specification.

VÁCLAV KOLÁŘ.